UNITED STATES PATENT OFFICE 1,943,738

PROCESS AND COMPOSITION FOR HARDENING COPPER

Charles E. Moyer, Long, Md.

No Drawing. Application March 22, 1933
Serial No. 662,182

4 Claims. (Cl. 75—62)

This invention has for its object to provide a process and composition for hardening copper in a simple and expeditious manner which will be sufficiently inexpensive to be commercially practical.

The copper to be treated is preferably reduced to small pieces to facilitate melting and is then placed in a crucible and heated to its melting temperature of 1083° C. As soon as the copper begins to melt a mixture of pulverized copper sulphate (blue stone), sodium chloride and borax is added. While these latter ingredients could be readily mixed with the comminuted copper prior to placing the same in the crucible, it is preferable to add such ingredients after the copper begins to melt thereby avoiding any deleterious effect on the ingredients prior to their entrance into the molten mass.

A typical formula is as follows:

Copper _____ 1 pound
Copper sulphate _____ 2 ounces
Salt _____ 2 ounces
Borax

As previously stated, the copper is reduced to small pieces and brought to a melting temperature. The copper sulphate ($CuSO_4$) is previously reduced to a comminuted form and mixed with the proper proportions of salt (NaCl) and borax ($Na_2B_4O_7$). This mixture is added to the copper as soon as the latter begins to melt, and when thoroughly incorporated, the material is poured into molds of the proper design for casting bearings or other articles desired to be manufactured of hardened copper, and allowed to cool.

Copper treated in this manner is extremely hard and durable and is useful in the manufacture of many articles heretofore made of steel.

Having fully described my invention, what I claim as new and desire to secure by Letters Patent is:

1. The herein described process of hardening copper which comprises heating copper to its melting point, and adding thereto copper sulphate, salt and borax in suitable proportions.

2. The herein described process of hardening copper which comprises reducing the copper to small pieces, heating the reduced copper to its melting point, and adding thereto copper sulphate, salt and borax in suitable proportions.

3. A hardened copper formed of the following ingredients:

Copper _____ 1 pound
Copper sulphate _____ 2 ounces
Salt _____ 2 ounces
Borax

4. The herein described process of hardening copper which comprises heating copper to its melting point, and adding thereto copper sulphate and salt in suitable proportions.

CHARLES E. MOYER.